US011333959B2

(12) United States Patent
Shiohara

(10) Patent No.: US 11,333,959 B2
(45) Date of Patent: *May 17, 2022

(54) POSITION DETECTION DEVICE, DISPLAY DEVICE, AND POSITION DETECTION METHOD

(71) Applicant: SEIKO EPSON CORPORATION, Tokyo (JP)

(72) Inventor: Ryuichi Shiohara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 139 days.

This patent is subject to a terminal disclaimer.

(21) Appl. No.: 16/658,918

(22) Filed: Oct. 21, 2019

(65) Prior Publication Data

US 2020/0124954 A1 Apr. 23, 2020

(30) Foreign Application Priority Data

Oct. 22, 2018 (JP) .............................. JP2018-198487

(51) Int. Cl.
| | |
|---|---|
| *G06F 3/042* | (2006.01) |
| *G06F 3/038* | (2013.01) |
| *G03B 21/20* | (2006.01) |
| *G06F 3/0354* | (2013.01) |

(52) U.S. Cl.
CPC ..... *G03B 21/2033* (2013.01); *G06F 3/03545* (2013.01); *G06F 3/0425* (2013.01); *G06F 3/0386* (2013.01)

(58) Field of Classification Search
None
See application file for complete search history.

(56) References Cited

U.S. PATENT DOCUMENTS

| | | | |
|---|---|---|---|
| 6,339,748 B1 | 1/2002 | Hiramatsu | |
| 6,847,356 B1 | 1/2005 | Hasegawa | |
| 2007/0065022 A1 | 3/2007 | Miyamoto | |
| 2011/0169756 A1 | 7/2011 | Ogawa et al. | |
| 2011/0169778 A1* | 7/2011 | Nungester ............. | G06F 3/0418 345/175 |
| 2011/0242060 A1 | 10/2011 | McGibney | |

(Continued)

FOREIGN PATENT DOCUMENTS

| | | |
|---|---|---|
| JP | 2007-088806 A | 4/2007 |
| JP | 2011-028629 A | 2/2011 |

(Continued)

*Primary Examiner* — Michelle M Iacoletti
*Assistant Examiner* — Danell L Owens
(74) *Attorney, Agent, or Firm* — Dority & Manning, P.A.

(57) ABSTRACT

A projector includes an imaging section for generating imaging data obtained by taking an image of first light emitted by a first pointing member, second light emitted by a second pointing member, and a target range, and a position detection section for detecting a first position and a second position with respect to the target range based on the imaging data so as to be distinguished from each other, and the imaging section includes a sensor for outputting detection values of first colored light, second colored light, and third colored light to detect first infrared light and light with a first wavelength included in the first light, and second infrared light and light with a second wavelength different from the first wavelength included in the second light with the sensor.

12 Claims, 8 Drawing Sheets

(56) References Cited

U.S. PATENT DOCUMENTS

| | | |
|---|---|---|
| 2012/0098746 A1 | 4/2012 | Ogawa |
| 2012/0212415 A1 | 8/2012 | Yokobayashi |
| 2012/0242880 A1 | 9/2012 | Kubo |
| 2013/0300658 A1* | 11/2013 | Endo .................. G06F 3/04883 |
| | | 345/157 |
| 2015/0035995 A1 | 2/2015 | Uchiyama |
| 2016/0140745 A1 | 5/2016 | Natori |
| 2017/0237955 A1 | 8/2017 | Koyama |
| 2017/0322672 A1 | 11/2017 | Kitani |
| 2018/0074654 A1 | 3/2018 | Tanaka |
| 2018/0217683 A1 | 8/2018 | Kobayashi |
| 2020/0124954 A1 | 4/2020 | Shiohara |

FOREIGN PATENT DOCUMENTS

| | | |
|---|---|---|
| JP | 2011-145762 A | 7/2011 |
| JP | 2013-149155 A | 8/2013 |
| JP | 2013149155 A | 8/2013 |
| JP | 2013-235416 A | 11/2013 |
| JP | 2015-215925 A | 12/2015 |
| JP | 2017-142726 A | 8/2017 |
| JP | 2017142726 A | 8/2017 |

* cited by examiner

POSITION DETECTION DEVICE, DISPLAY DEVICE, AND POSITION DETECTION METHOD The present application is based on, and claims priority from JP Application Serial Number 2018-198487, filed Oct. 22, 2018, the disclosure of which is hereby incorporated by reference herein in its entirety.

BACKGROUND

1. Technical Field

The present disclosure relates to a position detection device, a display device, and a position detection method.

2. Related Art

In the past, there has been known a system for identifying a plurality of electronic pens to detect operation positions when the plurality of electronic pens is operated on a screen on which a display image is displayed by a projector or the like (see, e.g., JP-A-2017-142726 (Document 1)). The system described in Document 1 uses a CMOS image sensor and an optical filter wheel provided with two optical filters as a configuration for detecting a plurality of electronic pens different from each other in wavelength of the infrared light to be emitted. In this configuration, due to a rotation of the optical filter wheel, light beams respectively transmitted through two types of optical filters are alternately detected by the image sensor.

SUMMARY

The present disclosure is made in view of the circumstances described above, and has an advantage of realizing a device for identifying a plurality of operation devices for emitting light to detect the operation positions with a simple configuration.

An aspect of the present disclosure is directed to a position detection device including an imaging section configured to generate imaging data obtained by taking an image of first light emitted by a first pointing member, second light emitted by a second pointing member, and a target range, and a position detection section configured to detect a first position of the first pointing member with respect to the target range and a second position of the second pointing member with respect to the target range based on the imaging data so as to be distinguished from each other, wherein the imaging section includes a sensor configured to output detection values of first colored light, second colored light, and third colored light to detect first infrared light and light with a first wavelength included in the first light and second infrared light and light with a second wavelength different from the first wavelength included in the second light with the sensor.

The position detection device described above may be configured such that the sensor is formed of an image sensor including a plurality of detection pixels, the imaging section outputs the imaging data including the detection values of the first colored light, the second colored light, and the third colored light corresponding to each of the detection pixels, and the position detection section detects the first position and the second position from one piece of the imaging data including the one detection value corresponding to each of the detection pixels.

The position detection device described above may be configured such that the sensor has a sensitivity characteristic in which relative sensitivity of the first colored light, the second colored light, and the third colored light at the first wavelength fails to coincide with relative sensitivity of the first colored light, the second colored light, and the third colored light at the second wavelength.

The position detection device described above may be configured such that the first wavelength is longer than the second wavelength, and the imaging section includes an optical filter configured to cut light in at least a part of a wavelength band between a wavelength of the first infrared light and the first wavelength, and the sensor detects light transmitted through the optical filter.

The position detection device described above may be configured such that the sensor has a sensitivity characteristic in which the relative sensitivity of the first colored light is higher than both of the relative sensitivity of the second colored light and the relative sensitivity of the third colored light at the wavelength of the first infrared light, and the relative sensitivity of the first colored light is higher than both of the relative sensitivity of the second colored light and the relative sensitivity of the third colored light at the wavelength cut by the optical filter.

The position detection device described above may be configured such that the optical filter cuts light longer in wavelength than the first infrared light.

The position detection device described above may be configured such that the optical filter cuts light in an ultraviolet region.

The position detection device described above may be configured such that a wavelength band of the first infrared light and a wavelength band of the second infrared light include a same wavelength.

In the position detection device described above, the light with the first wavelength included in the first light and the light with the second wavelength included in the second light may each be light in a visible region.

An aspect of the present disclosure is directed to a display device including an image display section configured to display an image based on image data on a display surface, an imaging section configured to generate imaging data obtained by taking an image of first light emitted by a first pointing member, second light emitted by a second pointing member, and at least a part of the display surface, a position detection section configured to detect a first position of the first pointing member with respect to the display surface and a second position of the second pointing member with respect to the display surface based on the imaging data so as to be distinguished from each other, and a processing section configured to perform a first process corresponding to the first position and a second process corresponding to the second position, and the imaging section includes a sensor configured to output detection values of first colored light, second colored light, and third colored light to detect first infrared light and light with a first wavelength included in the first light and second infrared light and light with a second wavelength different from the first wavelength included in the second light with the sensor.

The display device described above may be configured such that the processing section performs processes of performing drawings different from each other as the first process and the second process.

An aspect of the present disclosure is directed to a display system including a display device including an image display section configured to display an image based on image data on a display surface, and a first pointing member and a second pointing member used for a position pointing operation on the display surface, wherein the first pointing member emits first light, the second pointing member emits second light, the display device includes an imaging section configured to generate imaging data obtained by taking an image of the first light emitted by the first pointing member, the second light emitted by the second pointing member, and at least a part of the display surface, a position detection section configured to detect a first position of the first pointing member with respect to the display surface and a second position of the second pointing member with respect to the display surface based on the imaging data so as to be distinguished from each other, and a processing section configured to perform a first process corresponding to the first position and a second process corresponding to the second position, and the imaging section includes an optical sensor configured to output detection values of first colored light, second colored light, and third colored light to detect first infrared light and light with a first wavelength included in the first light and second infrared light and light with a second wavelength different from the first wavelength included in the second light with the optical sensor.

The display system described above may be configured such that the first pointing member and the second pointing member each include an operation sensor configured to detect an operation, a light source, and a light emission control section configured to make the light source emit light when the operation sensor detected the operation.

The display system described above may be configured such that the light source provided to the first pointing member emits the light with the first wavelength in a visible region, and the light source provided to the second pointing member emits the light with the second wavelength in the visible region.

An aspect of the present disclosure is directed to a position detection method including the steps of generating imaging data obtained by taking an image of first light emitted by a first pointing member, second light emitted by a second pointing member, and a target range, and detecting a first position of the first pointing member with respect to the target range and a second position of the second pointing member with respect to the target range based on the imaging data so as to be distinguished from each other, wherein the imaging data is generated using an imaging section including a sensor configured to output detection values of first colored light, second colored light, and third colored light to detect first infrared light and light with a first wavelength included in the first light, and second infrared light and light with a second wavelength different from the first wavelength included in the second light with the sensor.

The present disclosure can be implemented in a variety of aspects other than the position detection device, the display device, and the position detection method described above. For example, the present disclosure can be implemented as a program executed by a computer (or a processor) for executing the method described above. Further, the present disclosure can be implemented as a recording medium storing the program described above, a server for delivering the program, a transmission medium for transmitting the program described above, and a data signal including the computer program described above and embodied in a carrier wave.

DESCRIPTION OF EXEMPLARY EMBODIMENTS

General Description of Projection System

Figure 1:
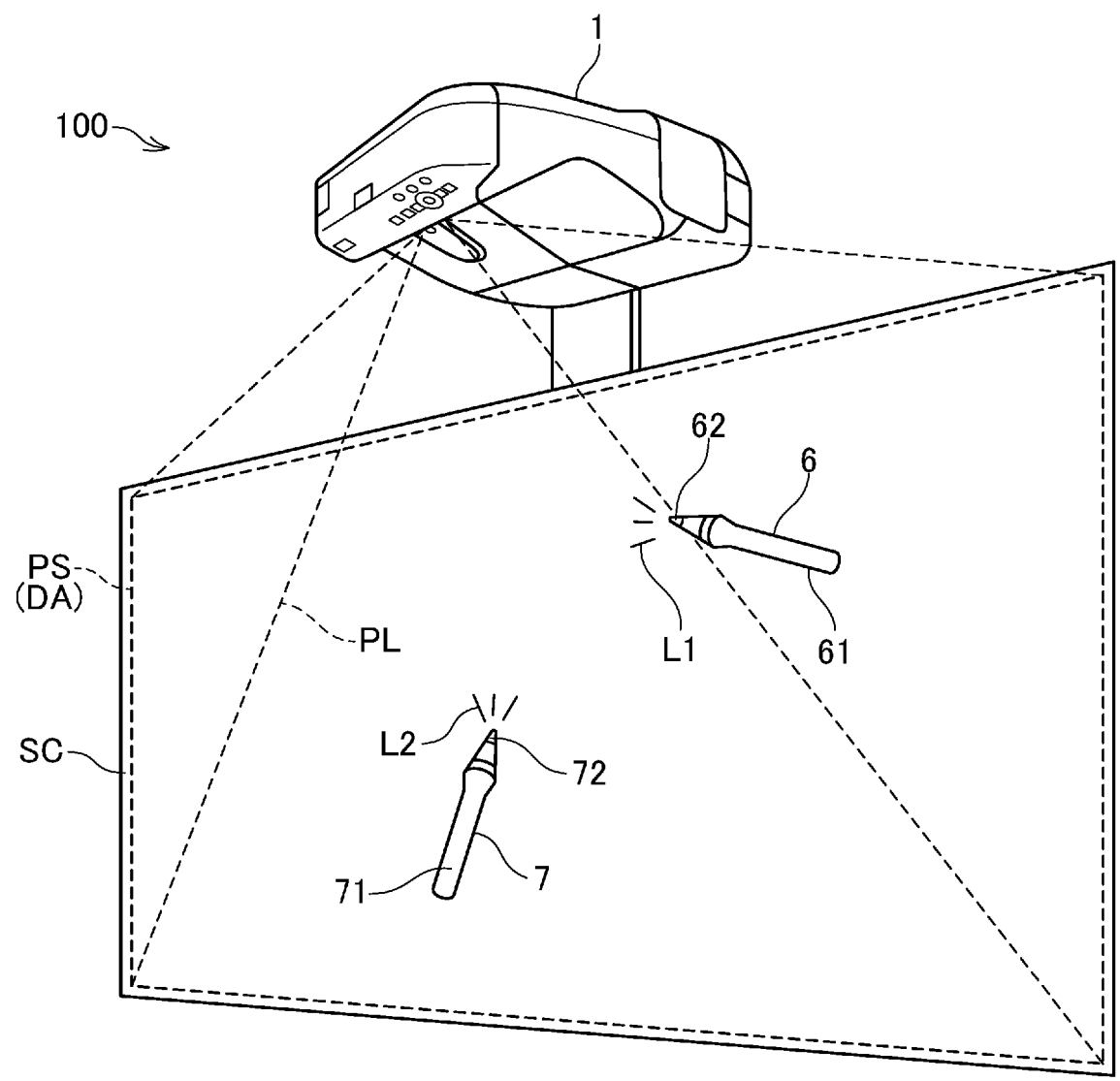
FIG. 1 is a schematic configuration diagram of a projection system.

FIG. 1 is a perspective view of a projection system 100 in an embodiment of the present disclosure. The projection system 100 has a projector 1, a first pointing member 6, and a second pointing member 7.

The projector 1 functions as a display device, and projects image light PL on a screen SC as a display surface to display an image on the display surface. The projection system 100 corresponds to a display system. Further, the projector 1 also functions as a position detection device for detecting pointing positions of the first pointing member 6 and the second pointing member 7 as detection target devices. In this case, the projection system 100 functions as a detection system.

The projector 1 projects the image light PL on the screen SC to thereby form a projection image PS on the screen SC. The projection image PS denotes an area of the image projected on the screen SC by the projector 1. In a normal use situation of the projector 1, the projection image PS is projected so as to fit into the screen SC.

A target range DA where the projector 1 detects the positions of the first pointing member 6 and the second pointing member 7 can be set as an arbitrary range including at least a part of the screen SC. Optimally, a range including the projection image PS is set as the target range DA. In the present embodiment, the range in which the projection image PS is projected is set as the target range DA.

The first pointing member 6 is a pointing member used by the user holding a shaft part 61 shaped like a pen in hand. The second pointing member 7 is a pointing member used by the user holding a shaft part 71 shaped like a pen in hand. When an operation of pressing a tip 62 against the screen SC is performed by the user, the first pointing member 6 emits light from the tip 62. When an operation of pressing a tip 72 against the screen SC is performed by the user, the second pointing member 7 similarly emits light from the tip 72. The projector 1 detects the light emitted by the first pointing member 6 and the light emitted by the second pointing member 7 to thereby detect the operation positions of the first pointing member 6 and the second pointing member 7. On this occasion, the projector 1 detects the operation position of the first pointing member 6 and the operation position of the second pointing member 7 so as to be distinguished from each other. The light emitted by the first pointing member 6 is defined as first light L1, and the light emitted by the second pointing member 7 is defined as second light L2.

In the present embodiment, there is described a configuration using two pointing members including one first pointing member 6 and one second pointing member 7. The number of pointing members which can be used in the projection system 100 is arbitrary, and can be one, or three or more.

Configuration of Pointing Members

Figure 2:
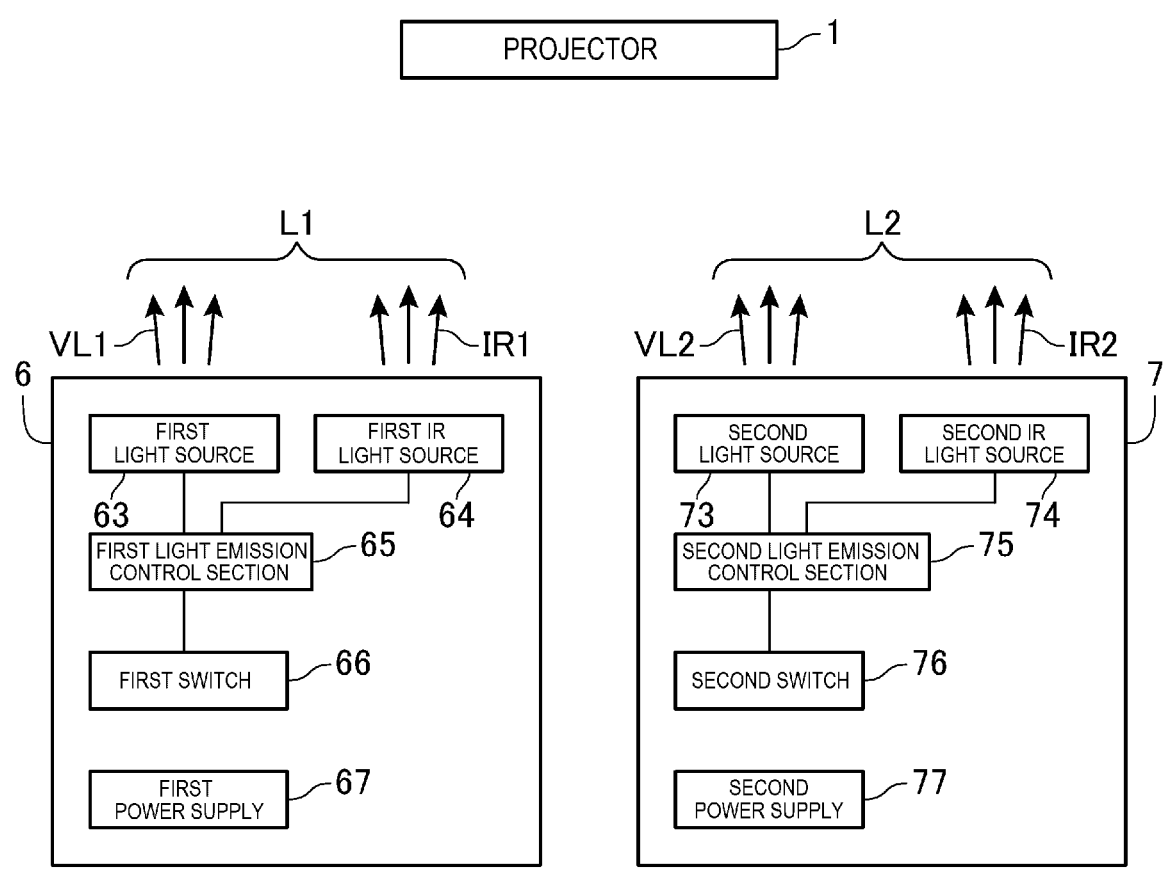
FIG. 2 is a block diagram of the projection system.

FIG. 2 is a block diagram of the projection system 100, and in particular shows a configuration of the first pointing member 6 and the second pointing member 7 in detail.

The first pointing member 6 is provided with a first visible light source 63, a first infrared light source 64, a first light emission control section 65, and a first switch 66. The first pointing member 6 is provided with a first power supply 67 for supplying other sections in the first pointing member 6 with electrical power. The first visible light source 63 and the first infrared light source 64 correspond to a light source of the first pointing member 6, the first light emission control section 65 corresponds to a light emission control section, and the first switch 66 corresponds to an operation sensor.

The first visible light source 63 and the first infrared light source 64 are each provided with a light emitting element such as a light emitting diode (LED), and are coupled to the first light emission control section 65. The first visible light source 63 is provided with a light emitting element for emitting light with a first wavelength, and is a light source for emitting the light in the visible region in the present embodiment. The first infrared light source 64 is provided with a light emitting element for emitting the light in the infrared region. The light emitted by the first visible light source 63 is defined as first visible light VL1, and the light emitted by the first infrared light source 64 is defined as first infrared light IR1. The first visible light VL1 and the first infrared light IR1 constitute the first light L1.

The first switch 66 is a switch-type sensor which is set to the ON state when pressure is applied to the tip 62, and is switched to the OFF state when the pressure on the tip 62 is removed. The first switch 66 functions as a sensor for detecting the pressure on the tip 62. The first switch 66 is coupled to the first light emission control section 65, and it is possible for the first light emission control section 65 to detect whether the first switch 66 is in the ON state or the OFF state.

The first light emission control section 65 detects the state of the first switch 66, and then puts the first visible light source 63 and the first infrared light source 64 on when the first switch 66 is in the ON state. For example, the first light emission control section 65 outputs an electrical current with a predetermined voltage or a pulse current to the first visible light source 63 and the first infrared light source 64 to put the first visible light source 63 and the first infrared light source 64 on.

The first light emission control section 65 can also be a device for independently putting each of the first visible light source 63 and the first infrared light source 64 on and off. In the present embodiment, the first light emission control section 65 simultaneously puts the first visible light source 63 and the first infrared light source 64 on and off.

The second pointing member 7 is provided with a second visible light source 73, a second infrared light source 74, a second light emission control section 75, and a second switch 76. The second pointing member 7 is provided with a second power supply 77 for supplying other sections in the second pointing member 7 with electrical power. The second visible light source 73 and the second infrared light source 74 correspond to a light source of the second pointing member 7, the second light emission control section 75 corresponds to a light emission control section, and the second switch 76 corresponds to an operation sensor.

The second visible light source 73 and the second infrared light source 74 are each provided with a light emitting element such as an LED, and are coupled to the second light emission control section 75. The second visible light source 73 is provided with a light emitting element for emitting light with a second wavelength, and is a light source for emitting the light in the visible region in the present embodiment. The second infrared light source 74 is provided with a light emitting element for emitting the light in the infrared region. The light emitted by the second visible light source 73 is defined as second visible light VL2, and the light emitted by the second infrared light source 74 is defined as second infrared light IR2. The second visible light VL2 and the second infrared light IR2 constitute the second light L2.

The second switch 76 is a switch-type sensor which is set to the ON state when pressure is applied to the tip 72, and is switched to the OFF state when the pressure on the tip 72 is removed. The second switch 76 functions as a sensor for detecting the pressure on the tip 72. The second switch 76 is coupled to the second light emission control section 75, and it is possible for the second light emission control section 75 to detect whether the second switch 76 is in the ON state or the OFF state.

The second light emission control section 75 detects the state of the second switch 76, and then puts the second visible light source 73 and the second infrared light source 74 on when the second switch 76 is in the ON state. For example, the second light emission control section 75 outputs an electrical current with a predetermined voltage or a pulse current to the second visible light source 73 and the second infrared light source 74 to put the second visible light source 73 and the second infrared light source 74 on.

The second light emission control section 75 can also be a device for independently putting each of the second visible light source 73 and the second infrared light source 74 on and off. In the present embodiment, the second light emission control section 75 simultaneously puts the second visible light source 73 and the second infrared light source 74 on and off.

The first visible light source 63 and the second visible light source 73 both emit the light included in the visible region of the wavelength of 400 nm ($0.4 \times 10^{-9}$ m) through 700 nm. In particular, the first visible light source 63 and the second visible light source 73 are each provided with a light emitting element for emitting light included in any of a wavelength band B1 including 460 nm, a wavelength band B2 including 555 nm, and a wavelength band B3 including 570 nm. The wavelength band B1 includes 460 nm, and belongs to a wavelength band of, for example, 450 nm through 470 nm. The wavelength band B2 includes 555 nm, and belongs to a wavelength band of, for example, 545 nm through 565 nm. The wavelength band B2 includes 570 nm, and belongs to a wavelength band of, for example, 570 nm through 600 nm.

The first visible light source 63 and the second visible light source 73 emit the light beams different in wavelength from each other. For example, when the first visible light VL1 emitted by the first visible light source 63 is the light beam with the wavelength included in the wavelength band B1, the second visible light VL2 emitted by the second visible light source 73 is the light beam with the wavelength included in the wavelength band B2 or the wavelength band B3. The first visible light VL1 and the second visible light VL2 are not required to be the light beam with a single wavelength. In this case, it is preferable for the first visible light VL1 and the second visible light VL2 not to include the same wavelength. Further, it is preferable for the wavelength of the light beam included in the first visible light VL1 and the wavelength of the light beam included in the second visible light VL2 to be distant from each other. For example, it is preferable to adopt a configuration in which the first visible light VL1 is the light beam included in the wavelength band B1, and the second visible light VL2 is the light beam included in the wavelength band B3.

The first infrared light source 64 and the second infrared light source 74 both emit the light included in the infrared region of the wavelength of 700 nm through 1,000 nm. Optimally, the first infrared light source 64 and the second infrared light source 74 emit the light included in the near infrared region of the wavelength of 700 nm through 2,500 nm. In the present embodiment, the first infrared light source 64 and the second infrared light source 74 emit the light beams in the wavelength bands at least overlapping each other, and preferably emit the light beams in the same wavelength band. For example, the first infrared light source 64 and the second infrared light source 74 are respectively formed of the light emitting elements having the specifications of the output wavelength common to each other. Therefore, the first infrared light IR1 and the second infrared light IR2 are the light beams in the common wavelength band. Specifically, the first infrared light IR1 and the second infrared light IR2 include the light beams in the wavelength band of a 760 nm band. Further, the first infrared light IR1 and the second infrared light IR2 can also be a light beam with the wavelength of 760 nm.

Configuration of Projector

Figure 3:
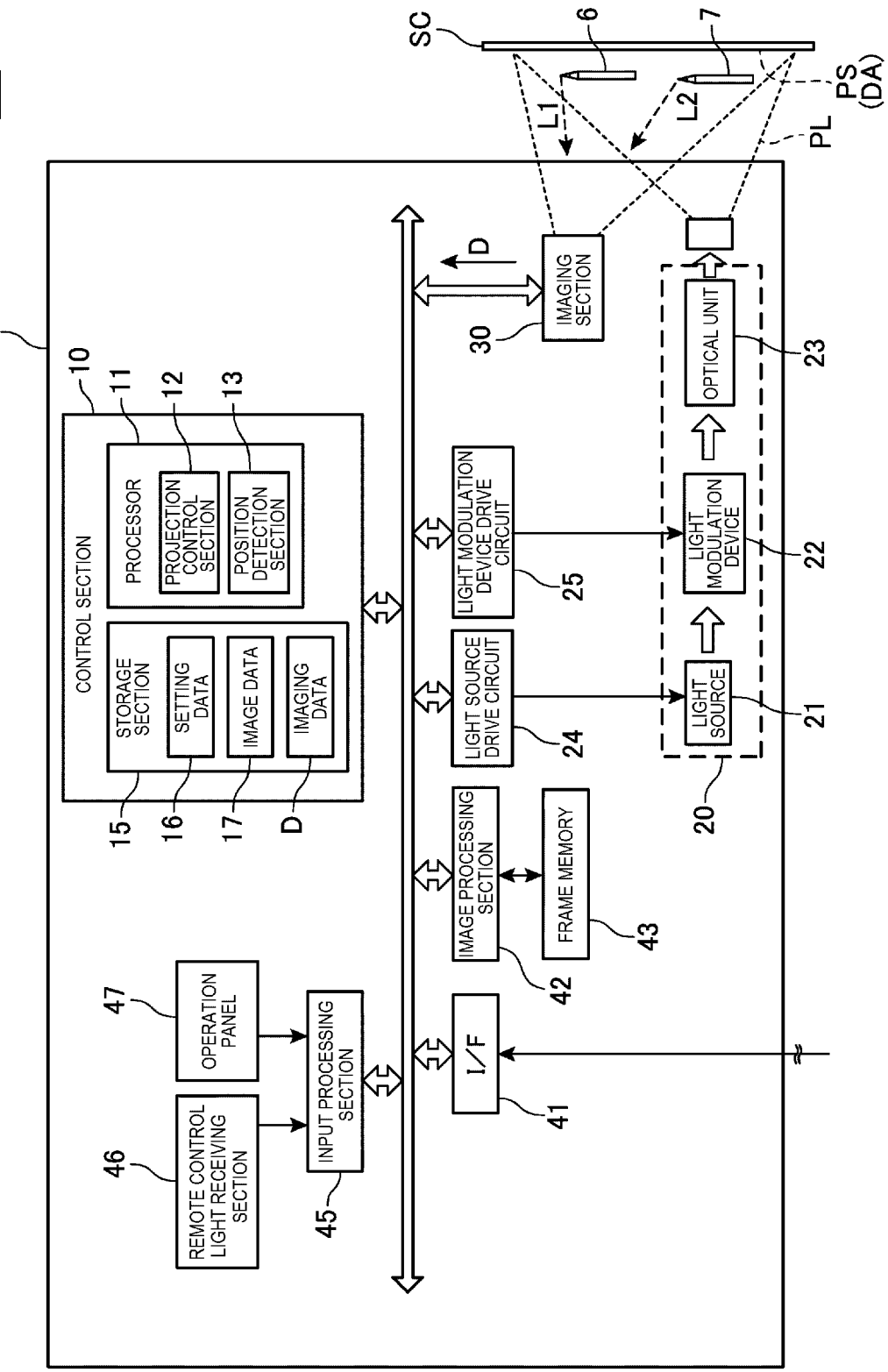
FIG. 3 is a block diagram of the projection system.

FIG. 3 is a block diagram of the projection system 100, and in particular shows a configuration of the projector 1 in detail.

The projector 1 is provided with a control section 10 for controlling each section of the projector 1. The control section 10 can also be a device provided with, for example, an arithmetic processing device for executing a program to realize the function of the control section 10 due to the cooperation of hardware and software. Alternatively, it is also possible for the control section 10 to be configured by the hardware in which the arithmetic processing function is programmed. In the present embodiment, as an example, the control section 10 denotes a configuration provided with a storage section 15 for storing the program, and a processor 11 for executing the program. The processor 11 is an arithmetic processing device formed of a CPU (central processing unit), a microcomputer, or the like. The processor 11 executes the control program stored in the storage section 15 to control each section of the projector 1.

The storage section 15 has a nonvolatile storage area for storing the program to be executed by the processor 11 and data to be processed by the processor 11 in a nonvolatile manner. It is also possible for the storage section 15 to be a device provided with a volatile storage area to form a working area for temporarily storing the program to be executed by the processor 11 and the data as the processing target.

For example, in the present embodiment, the storage section 15 stores setting data 16, image data 17, and imaging data D. The setting data 16 includes setting values related to processing conditions of a variety of types of processing performed by the processor 11. The setting data 16 includes setting values related to image processing performed by an image processing section 42.

The image data 17 is image data input from an interface 41 described later. A projection control section 12 makes a projection section 20 project an image based on the image data 17.

The imaging data D is data of a taken image taken by an imaging section 30.

The processor 11 can be formed of a single processor, or can also be formed of a plurality of processors. The processor 11 can also be formed of an SoC (system-on-chip) integrated with a part or the whole of the storage section 15 and/or other circuits. Further, as described above, the processor 11 can also be formed of a combination of the CPU for executing the program and a DSP (digital signal processor) for executing predetermined arithmetic processing. It is also possible to adopt a configuration in which all of the functions of the processor 11 are implemented in the hardware, or it is also possible to configure all of the functions of the processor 11 using a programmable device. Further, it is also possible for the processor 11 to also function as the image processing section 42. In other words, it is also possible for the processor 11 to perform the function of the image processing section 42.

The processor 11 is provided with a projection control section 12 for performing the control of projecting the image light PL. Further, the processor 11 is provided with a position detection section 13 for detecting the operation positions of the first pointing member 6 and the second pointing member 7.

It is obviously possible to partially configure the projection control section 12 and the position detection section 13 with separate hardware from the processor 11.

The projector 1 is provided with the projection section 20. The projection section 20 is provided with a light source 21, a light modulation device 22, and an optical unit 23. To the projection section 20, there are coupled a light source drive circuit 24 and a light modulation device drive circuit 25 operating in accordance with the control by the control section 10. The projection section 20 corresponds to an image display section.

The light source 21 is formed of a solid-state light source such as an LED or a laser source. It should be noted that the light source 21 can also be a lamp such as a halogen lamp, a xenon lamp, or a super high-pressure mercury lamp. Further, it is also possible for the light source 21 to be a light source for emitting light with a different wavelength from the wavelength of the light included in the first light L1 to be emitted from the first pointing member 6, and the wavelength of the light included in the second light L2 to be emitted from the second pointing member 7. For example, it is also possible to adopt the light source for emitting the light with a different wavelength from the wavelength of the first visible light VL1, the wavelength of the second visible light VL2, the wavelength of the first infrared light IR1, and the wavelength of the second infrared light IR2. The light source 21 is driven by the light source drive circuit 24 to emit the light. It is also possible for the projector 1 to be provided with a drive circuit for supplying the light source 21 with the electrical power in accordance with the control by the control section 10.

The light modulation device 22 modulates the light emitted by the light source 21 to generate the image light PL, and then irradiates the optical unit 23 with the image light PL. The light modulation device 22 is provided with a light modulation element such as a transmissive liquid crystal light valve, a reflective liquid crystal light valve, or a digital mirror device. The light modulation element of the light modulation device 22 is coupled to the light modulation device drive circuit 25. The light modulation device drive circuit 25 drives the light modulation element of the light modulation device 22 to sequentially form the light modulation element of the light modulation device 22 line by line, and finally form the image frame by frame. It is also possible for the light modulation device 22 to be provided with a drive circuit for driving the light modulation element. For example, when the light modulation device 22 is formed of a liquid crystal light valve, it is also possible to provide a liquid crystal driver circuit as the drive circuit.

The optical unit 23 is provided with an optical element such as a lens or a mirror, and focuses the image light PL modulated by the light modulation device 22 on the screen SC to display the projection image PS based on the image data 17 on the screen SC.

As shown in FIG. 1, the projector 1 can also be provided with an interface 41, an image processing section 42, and an input processing section 45. These sections are coupled to the control section 10.

The interface 41 is an interface to which the image data is input, and is provided with a connector to which a transmission cable not shown is coupled, and an interface circuit for receiving the image data via the transmission cable.

To the interface 41, it is possible to couple an image supply device for supplying the image data. As the image supply device, it is possible to use, for example, a notebook personal computer (PC), a desktop PC, a tablet terminal, a smartphone, and a personal digital assistant (PDA). The image supply device can also be a video reproduction device, a DVD (digital versatile disk) player, a Blu-ray disc player, or the like. The image supply device can also be a hard disk recorder, a television tuner device, a set-top box for a CATV (cable television), a video gaming machine, or the like. The image data to be input to the interface 41 can be moving image data, or still image data, and any data format can be adopted.

The image processing section 42 processes the image data input to the interface 41. To the image processing section 42, there is coupled a frame memory 43. The image processing section 42 processes the image data of the image to be projected by the projection section 20 in accordance with the control by the projection control section 12. It is also possible to assume that the image processing section 42 performs the processing by only a part of the area of the frame memory 43, namely by several lines through several tens of lines, but does not perform the processing using the frame memory 43 as the frame memory of the entire screen.

The image processing section 42 performs a variety of types of processing including, for example, a geometric correction process for correcting a keystone distortion of the projection image PS, and an OSD (on-screen display) process for superimposing an OSD image. It is also possible for the image processing section 42 to perform an image adjustment process for adjusting a luminance or a color on the image data. It is also possible for the image processing section 42 to perform a resolution conversion process for adjusting the aspect ratio and the resolution of the image data so as to correspond to the light modulation device 22. It is also possible for the image processing section 42 to perform other image processing such as a frame rate conversion.

The image processing section 42 generates an image signal based on the image data on which the process has been performed, and then outputs the image signal to the light modulation device 22. The projection control section 12 makes the light modulation device 22 operate based on the image signal output by the image processing section 42 to make the projection section 20 project the image light PL.

The input processing section 45 receives an input to the projector 1. The input processing section 45 is coupled to a remote control light receiving section 46 for receiving an infrared signal transmitted by a remote controller not shown, and an operation panel 47 provided to the main body of the projector 1. The input processing section 45 decodes the signal received by the remote control light receiving section 46 to detect an operation by the remote controller. Further, the input processing section 45 detects an operation on the operation panel 47. The input processing section 45 outputs data representing the operation content to the control section 10.

The projector 1 is provided with the imaging section 30 as a configuration for detecting the pointing operations with the first pointing member 6 and the second pointing member 7 to identify the operation positions.

On the screen SC, there is set the target range DA for detecting the operations of the first pointing member 6 and the second pointing member 7. In the present embodiment, the range where the projection section 20 projects the projection image PS coincides with the target range DA. The imaging section 30 takes an image of an imaging range, namely a field angle, including the target range DA.

The imaging section 30 is a so-called digital camera, and performs the imaging with the control by the position detection section 13, and then outputs the imaging data D to the control section 10. The imaging data D is stored in the storage section 15. Since the field angle of the imaging section 30 includes the target range DA of the operations of the first pointing member 6 and the second pointing member 7 as described above, the imaging data D is the image data obtained by taking an image of the screen SC including the projection image PS. The field angle of the imaging section 30 preferably includes the whole of the target range DA, but can also be a field angle including a part of the target range DA.

The position detection section 13 controls the imaging section 30 to perform the imaging. The imaging section 30 outputs the imaging data D in accordance with the control by the position detection section 13, and the imaging data D output by the imaging section 30 is stored in the storage section 15. The position detection section 13 analyzes the imaging data D to detect the operation position of the first pointing member 6 and the operation position of the second pointing member 7 so as to be distinguished from each other. The operation position of the first pointing member 6 detected by the position detection section 13 corresponds to a first position, and the operation position of the second pointing member 7 corresponds to a second position.

Configuration of Imaging Section

Figure 4:
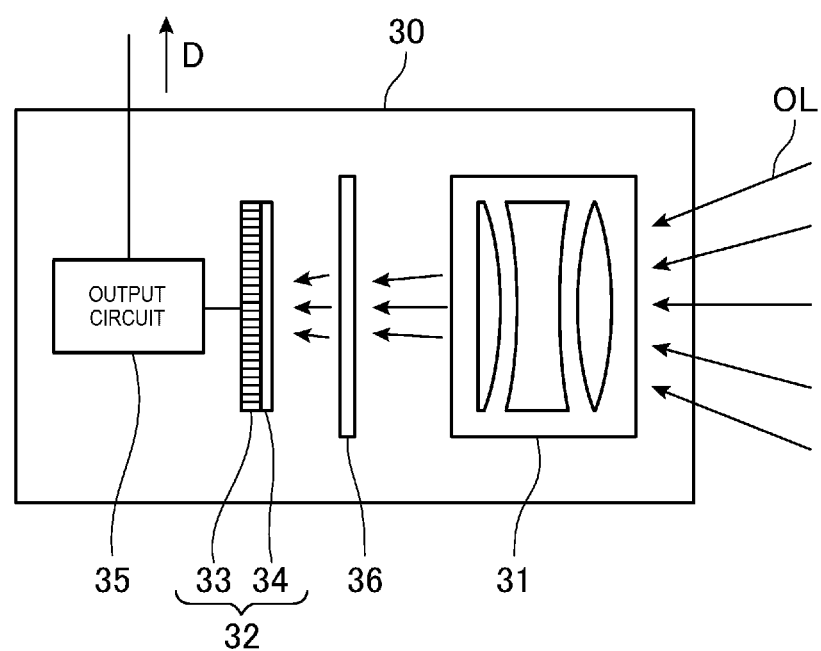
FIG. 4 is a schematic configuration diagram of an imaging section.

FIG. 4 is a schematic configuration diagram of the imaging section 30. In FIG. 4, the light entering the imaging section 30 from outside is defined as incident light OL.

The imaging section 30 is provided with an imaging optical unit 31 having a lens for collecting the incident light OL, and an image sensor 32 for detecting the light collected by the imaging optical unit 31. The image sensor 32 is provided with light receiving elements 33, and a color filter array 34 disposed on the incident side of the light receiving elements 33. To the image sensor 32, there is coupled an output circuit 35 for retrieving the output values of the light receiving elements 33 to generate the imaging data D. The image sensor 32 corresponds to an optical sensor.

Figure 5:
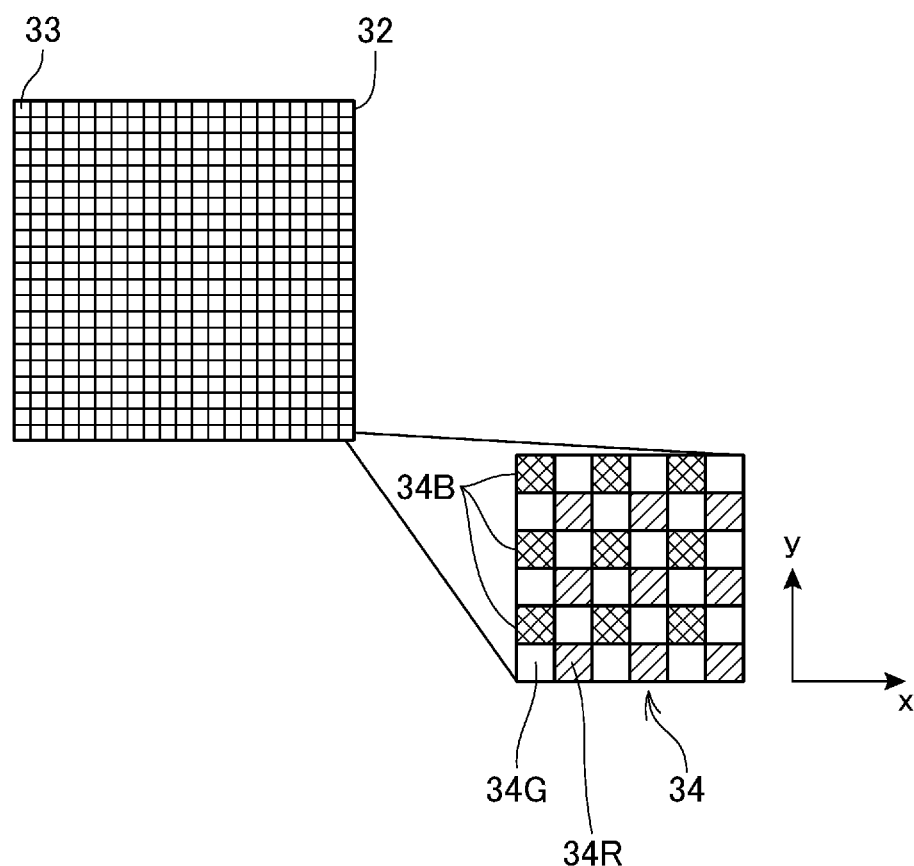
FIG. 5 is a configuration diagram of an image sensor.

FIG. 5 is a configuration diagram of the image sensor 32.

The image sensor 32 is formed of, for example, a CMOS (complementary metal oxide semiconductor) image sensor or a CCD (charge coupled device) image sensor. The image sensor 32 is constituted by a number of light receiving elements 33 arranged in a matrix. Each of the light receiving elements 33 corresponds to a detection pixel.

The color filter array 34 is disposed so as to overlap the respective light receiving elements 33 arranged on the image sensor 32. The color filter array 34 is a filter having a plurality of color filters arranged so as to correspond to the positions of the respective light receiving elements 33. The color filters of the color filter array 34 include red-filters 34R, blue-filters 34B, and green-filters 34G, and are each arranged in a checkered pattern. FIG. 5 shows an example in which the color filters are arranged in a matrix to form the checkered pattern along the rows in the x direction and the columns in the y direction in the color filter array 34.

The red-filters 34R are each a filter for attenuating or blocking the light with the wavelength other than that of the red light in order to make the light receiving element 33 detect the red light. The light receiving elements 33 overlapping the red-filters 34R receive and detect the red light.

Further, the blue-filters 34B are each a filter for attenuating or blocking the light with the wavelength other than that of the blue light in order to make the light receiving element 33 detect the blue light. The light receiving elements 33 overlapping the blue-filters 34B receive and detect the blue light.

The green-filters 34G are each a filter for attenuating or blocking the light with the wavelength other than that of the green light in order to make the light receiving element 33 detect the green light. The light receiving elements 33 overlapping the green-filters 34G receive and detect the green light.

As described above, the image sensor 32 detects the red color, the blue color, and the green color with the light receiving elements 33 using the color filter array 34, and then outputs the detection values.

The red-filters 34R, the blue-filters 34B, and the green-filters 34G are arbitrarily arranged in the color filter array 34, and are arranged in accordance with, for example, a Bayer arrangement. In this case, the color filter array 34 includes rows in which the red-filters 34R and the green-filters 34G are alternately arranged in the x direction, and rows in which the blue-filters 34B and the green-filters 34G are alternately arranged, and these rows are alternately arranged in the y direction. In this example, the green-filters 34G are arranged in higher density than those of the red-filters 34R and the blue-filters 34B corresponding to the fact that the visual feature of the human is sensitive to the luminance of a green color.

The configuration of the color filter array 34 shown in FIG. 5 is illustrative only. It is also possible for the color filter array 34 to have a configuration including transparent filters for a white color in addition to the red-filters 34R, the blue-filters 34B, and the green-filters 34G. Further, as the color filter array 34, it is also possible to adopt a configuration using color filters of complementary colors including filters for cyan, filters for magenta, and filters for yellow.

Going back to FIG. 4, the output circuit 35 samples the detection value of each of the light receiving elements 33 constituting the image sensor 32. The output circuit 35 performs a variety of types of processing such as an interpolation process for each pixel, a white balance adjustment process, a color separation process, and a false color suppression process to generate the imaging data D including the output values of RGB of each pixel.

The imaging data D is still image data including a plurality of pixels, and including the pixel values of the plurality of colors for each pixel. It is also possible for the number of pixels included in the imaging data D to coincide with the number of the light receiving elements 33, or fail to coincide with the number of the light receiving elements 33. The pixel values included in the imaging data D are, for example, data of the colors of R, G, and B, but can also include the pixel values of Y, U, and V as described later.

The imaging data D includes a pixel value of a predetermined number of bits for each pixel. In a typical example, the imaging data D includes the RGB data in 24 bits for each pixel.

The specific format of the imaging data D is not limited. For example, the imaging data D can also be RAW data, or the image data in the JPEG (joint photographic experts group) format. Alternatively, it is also possible to adopt the image data in the PNG (portable network graphics) format, or other formats. It is also possible for the output circuit 35 to perform signal processing of converting the output values of RGB into the YUV values to output the imaging data D including the YUV data to the control section 10. For example, it is also possible to treat it as a video output format for sequentially outputting the data in 8 bits for each of RGB, in 24 bits for each pixel, along the rows in the x direction and the columns in the y direction.

The imaging section 30 is provided with an optical filter 36 on an incident side of the image sensor 32, namely the side which the incident light OL enters. The optical filter 36 is a filter for blocking or attenuating the light with a wavelength set in advance. Characteristics of the optical filter 36 will be described later.

Detection by Imaging Section

Figure 6:
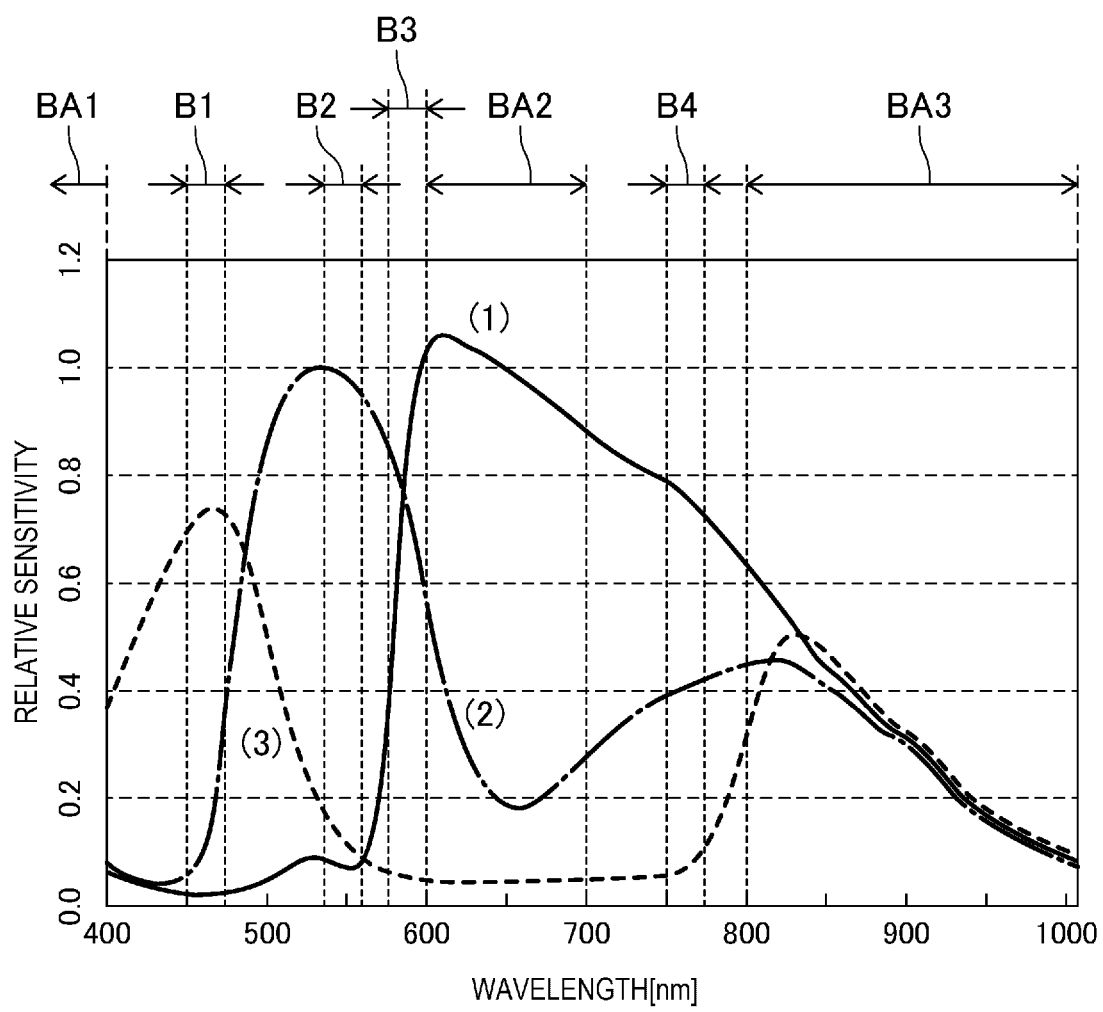
FIG. 6 is a diagram showing light receiving characteristics of the image sensor.

FIG. 6 is a diagram showing light receiving characteristics of the image sensor 32. The horizontal axis in FIG. 6 represents the wavelength, and the vertical axis represents relative sensitivity. FIG. 6 shows correlation between the wavelength and the relative sensitivity of the image sensor 32 with the waveforms indicated by (1), (2), and (3). The waveform (1) represents the relative sensitivity of the red light. The output value of the light receiving element 33 overlapping the red-filter 34R corresponds to the waveform (1) of the relative sensitivity characteristic. Similarly, the waveform (2) represents the relative sensitivity of the green light, and the output value of the light receiving element 33 overlapping the green-filter 34G corresponds to the waveform (2) of the relative sensitivity characteristic. The waveform (3) represents the relative sensitivity of the blue light, and the output value of the light receiving element 33 overlapping the blue-filter 34B corresponds to the waveform (3) of the relative sensitivity characteristic.

In FIG. 6, the wavelength bands in which the light is blocked or attenuated by the optical filter 36 are denoted by the reference symbols BA1, BA2, and BA3.

The optical filter 36 is not limited to a filter for completely blocking the light in each of the wavelength bands BA1, BA2, and BA3, but is sufficiently a filter for attenuating the light in each of the wavelength bands BA1, BA2, and BA3. For example, it is sufficient for the transmittance in each of the wavelength bands BA1, BA2, and BA3 to be equal to or lower than 80%. It should be noted that the transmittance in each of the wavelength bands BA1, BA2, and BA3 is preferably no higher than several %, and is more preferably set to 0%. In the following description, the expression that the optical filter 36 blocks the light in the wavelength bands BA1, BA2, and BA3 includes blocking the light in the wavelength bands BA1, BA2, and BA3 and attenuating the light in the wavelength bands BA1, BA2, and BA3.

The wavelength band BA1 includes an ultraviolet region of the wavelength shorter than 400 nm through the wavelength of 400 nm. The lower limit of the wavelength band BA1 is not limited, but can be set to, for example, 380 nm or 350 nm. The wavelength band BA2 includes the wavelength in at least a range of 600 nm through 650 nm, and preferably includes a range of 580 nm through 670 nm. The wavelength band BA2 corresponds to the wavelength of the red light in the visible region. The wavelength band BA3 includes at least a wavelength band of 800 nm through 1,000 nm, and preferably includes a range of 780 nm through 1,200 nm. The wavelength band BA3 includes the near infrared region.

Further, it is also possible for the optical filter 36 to be a filter for blocking light in a wavelength band shorter than 380 nm and a wavelength band longer than 1,200 nm.

The relative sensitivity of the image sensor 32 does not become 0 even in the wavelength band other than the visible region, for example, the wavelength band not shorter than 700 nm and not longer than 1,000 nm. Therefore, the image sensor 32 receives the light in other wavelength bands than the wavelength bands BA1, BA2, and BA3 out of the wavelength band of 400 nm through 1,000 nm shown in FIG. 6, and then outputs a significant output value.

The reference symbols B1, B2, and B3 respectively denote the wavelength bands B1, B2, and B3 described above. The first visible light VL1 and the second visible light VL2 each correspond to any of the wavelength bands B1, B2, and B3. The wavelength of the first visible light VL1 corresponds to the first wavelength, and the wavelength of the second visible light VL2 corresponds to the second wavelength. In other words, the first wavelength is included in any of the wavelength bands B1, B2, and B3, and the second wavelength is included in different one of the wavelength bands B1, B2, and B3 from the first wavelength.

The reference symbol B4 denotes the wavelength band including the first infrared light IR1 and the second infrared light IR2. The wavelength band B4 is a near infrared wavelength band including 760 nm.

The light in the wavelength band B1 is so-called blue light, the light in the wavelength band B2 is so-called green light, the light in the wavelength band B3 is so-called yellow light.

The image sensor 32 has sensitivity also in a near ultraviolet region. In the wavelength band B4, the value of the relative sensitivity (1) of the red light in the image sensor 32 is about 0.8, the value of the relative sensitivity (2) of the green light is about 0.4, and the value of the relative sensitivity (3) of the blue light is about 0.1. Therefore, when the image sensor 32 has received the light in the wavelength band B4, the image sensor 32 outputs substantially the same output value as when receiving the light including an orange color.

Further, in the wavelength band including 850 nm, the ratios between the relative sensitivity (1) of the red light, the relative sensitivity (2) of the green light, and the relative sensitivity (3) of the blue light in the image sensor 32 are substantially the same. Therefore, when the image sensor 32 has received the light in an 850 nm band, the image sensor 32 outputs substantially the same output value as when the image sensor 32 has received the light including a white color. It should be noted that in the present embodiment, the light in the 850 nm band is blocked by the optical filter 36.

When the image sensor 32 has received the blue light as the light included in the wavelength band B1, the image sensor 32 forms a blue image in the imaging data D. When the image sensor 32 has received the green light as the light included in the wavelength band B2, and when the image sensor 32 has received the yellow light as the light included in the wavelength band B3, the green image and the yellow image are respectively formed in the image data D in a similar manner.

Here, when the image sensor 32 has received the light included in the wavelength band B1 and the light included in the wavelength band B4, the image sensor 32 outputs substantially the same output value as when the image sensor 32 has received magenta light based on the relative sensitivity characteristics of R, G, and B shown in FIG. 6. In other words, the magenta image is formed in the imaging data D.

Further, when the image sensor 32 has received the light included in the wavelength band B2 and the light included in the wavelength band B4, the image sensor 32 outputs substantially the same output value as when the image sensor 32 has received the yellow light based on the relative sensitivity characteristics of R, G, and B shown in FIG. 6. In other words, a yellow image is formed in the imaging data D.

Further, when the image sensor 32 has received the light included in the wavelength band B3 and the light included in the wavelength band B4, the image sensor 32 outputs substantially the same output value as when the image sensor 32 has received the orange light based on the relative sensitivity characteristics of R, G, and B shown in FIG. 6. In other words, an orange image is formed in the imaging data D.

Further, since the optical filter 36 blocks the light in the wavelength band BA2 including the wavelength band corresponding to the red light, when the image sensor 32 has received the magenta light, the image sensor 32 outputs substantially the same output value as when the image sensor 32 has received the blue light.

As described above, the imaging section 30 combines the sensitivity characteristics of the image sensor 32 and the optical filter 36 for blocking the wavelength bands BA1, BA2, and BA3 with each other, and thus, the images of the different colors from when the optical filter 36 does not exist is formed in the imaging data D by the imaging section 30.

Therefore, when the first visible light VL1 is the light included in the wavelength band B1, when the image sensor 32 has received the first light L1 including the first visible light VL1 and the first infrared light IR1, the image sensor 32 forms the magenta image in the imaging data D. When the first visible light VL1 is the light included in the wavelength band B2, when the image sensor 32 has received the first light L1, the image sensor 32 forms the yellow image in the imaging data D. When the first visible light VL1 is the light included in the wavelength band B3, when the image sensor 32 has received the first light L1, the image sensor 32 forms the orange image in the imaging data D. The same applies to the second light L2.

In other words, the first light L1 and the second light L2 are detected by the imaging section 30 as the light of any of magenta, yellow, and orange, and the image of the first light L1 and the image of the second light L2 form images different in color in the imaging data D. Therefore, the image of the first light L1 and the image of the second light L2 showing in the imaging data D can be distinguished by color.

It is possible for the position detection section 13 to identify the position of the image in the imaging data D to detect the position thus identified as the operation position of the first pointing member 6 or the second pointing member 7. It is possible for the position detection section 13 to distinguish whether the position of the image detected in the imaging data D is the operation position of the first pointing member 6 or the operation position of the second pointing member 7 based on the colors. Further, the position detection section 13 performs a conversion process for converting the operation position of the first pointing member 6 in the imaging data D into a position of the first pointing member 6 in the target range DA to detect the operation by the first pointing member 6. Similarly, the position detection section 13 performs a conversion process for converting the operation position of the second pointing member 7 in the imaging data D into a position of the second pointing member 7 in the target range DA to detect the operation by the second pointing member 7.

Here, the color in which the first light L1 is detected by the image sensor 32 is defined as a first detection color, and the color in which the second light L2 is detected by the image sensor 32 is defined as a second detection color. The first detection color is a color of the image when the image sensor 32 has detected both of the first visible light VL1 and the first infrared light IR1. The second detection color is a color of the image when the image sensor 32 has received both of the second visible light VL2 and the second infrared light IR2. The first detection color and the second detection color are any of a magenta color, a yellow color, and the orange color, and are different from each other.

The position detection section 13 previously has the RGB data of the magenta color, the yellow color, and the orange color which can be the first detection color and the second detection color. These data are stored in the storage section 15 as the setting data 16, for example. The position detection section 13 detects the pixels corresponding to the RGB data of the magenta color, the yellow color, and the orange color from the imaging data D. The RGB data of each of the colors can also be values of the respective colors of R, G, and B, or can also be data defining the ranges of the values of the respective colors. Further, when the wavelength bands of the first light L1 and the second light L2 are known, it is also possible for the position detection section 13 to have the RGB data with respect only to the colors corresponding to the first light L1 and the second light L2 out of the magenta color, the yellow color, and the orange color.

The operation of the projector 1 described hereinafter is an operation example when the position detection section 13 has the RGB data of the color corresponding to the detection color of the first light L1 as the first detection color, and has the RGB data of the color corresponding to the detection color of the second light L2 as the second detection color. In this case, the position detection section 13 performs the detection with respect to the two colors. For example, when the projector 1 has the RGB data of all of the magenta color, the yellow color, and the orange color, operation positions of three pointing members can be detected so as to be distinguished from each other.

Operation of Projector

Figure 7:
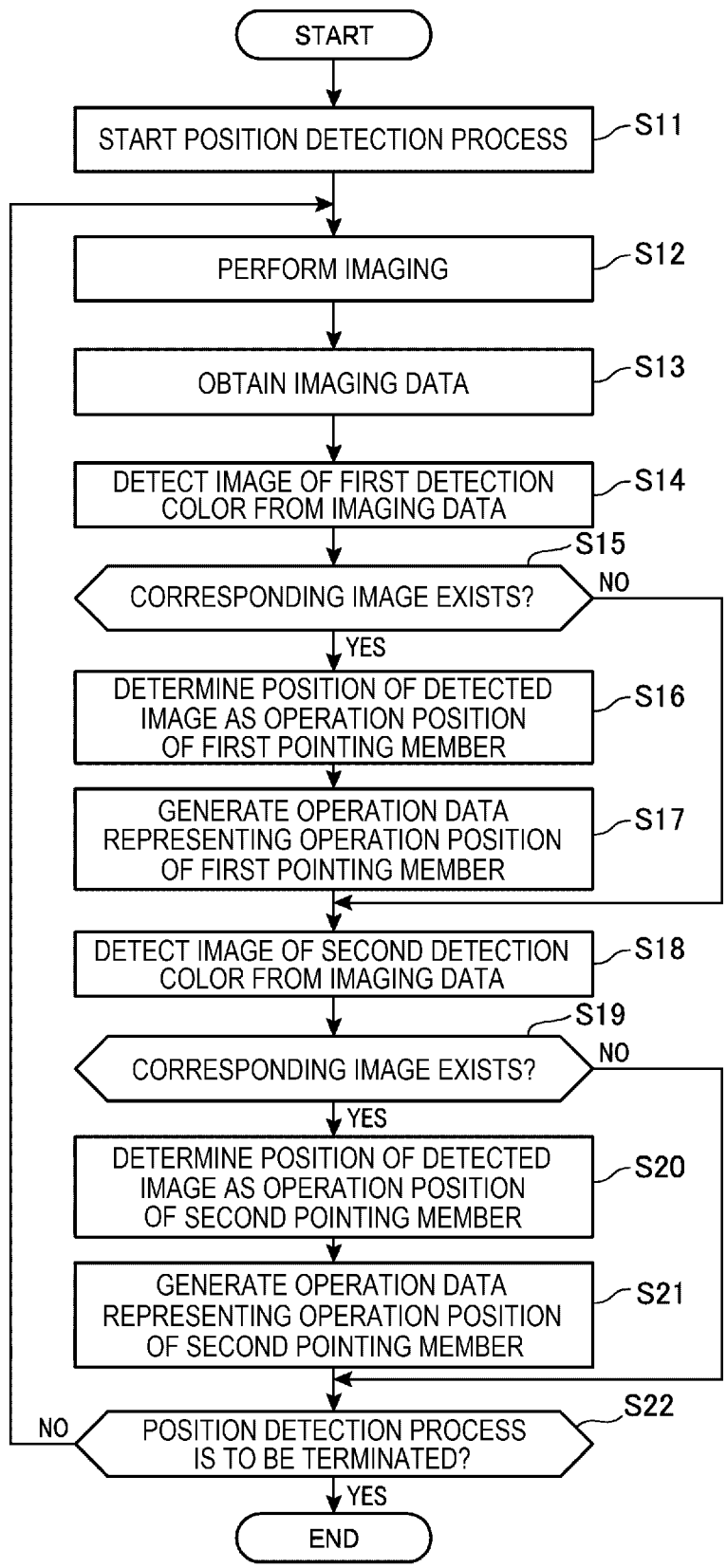
FIG. 7 is a flowchart showing an operation of a projector.

FIG. 7 is a flowchart showing the operation of the projector 1.

The position detection section 13 starts (step S11) the position detection process to make the transition to an operation state in which the operation positions of the first pointing member 6 and the second pointing member 7 can be detected. The position detection section 13 controls the imaging section 30 to perform (step S12) the imaging. The imaging section 30 performs the imaging in the step S12 in accordance with the control by the position detection section 13 to output the imaging data D to the control section 10, and the imaging data D is stored in the storage section 15.

The position detection section 13 obtains (step S13) the imaging data D, and then detects (step S14) the image of the first detection color from the imaging data D. The position detection section 13 determines (step S15) whether or not the image of the first detection color exists, and when the image of the first detection color exists (YES in the step S15), the position detection section 13 determines (step S16) the position of the image thus detected as the operation position of the first pointing member 6. The position detection section 13 converts the position of the image detected in the step S14 into a positional coordinate in the target range DA to generate (step S17) the operation data representing the operation position of the first pointing member 6.

After generating the operation data in the step S17, the position detection section 13 makes the transition of the process to the step S18. Further, when it has been determined that the image of the first detection color does not exist (NO in the step S15), the position detection section 13 makes the transition of the process to the step S18.

In the step S18, the position detection section 13 detects (step S18) the image of the second detection color from the imaging data D. The position detection section 13 determines (step S19) whether or not the image of the second detection color exists, and when the image of the second detection color exists (YES in the step S19), the position detection section 13 determines (step S20) the position of the image thus detected as the operation position of the second pointing member 7. The position detection section 13 converts the position of the image detected in the step S18 into a positional coordinate in the target range DA to generate (step S21) the operation data representing the operation position of the second pointing member 7.

After generating the operation data in the step S21, the position detection section 13 makes the transition of the process to the step S22 to determine (step S22) whether to terminate the position detection process. Further, when it has been determined that the image of the second detection color does not exist (NO in the step S19), the position detection section 13 makes the transition of the process to the step S22 to perform the determination.

When the input processing section 45 has received the operation of instructing the termination of the position detection process, or when the power OFF of the projector 1 has been instructed, the position detection section 13 determines that the position detection process is to be terminated (YES in the step S22). On this occasion, the position detection section 13 terminates the process of detecting the operation positions of the first pointing member 6 and the second pointing member 7. When the position detection section 13 has determined that the position detection process is not to be terminated (NO in the step S22), the process returns to the step S12.

The operation data generated by the position detection section 13 in the steps S17, S20 can be used for a variety of processes by the projector 1. For example, it is also possible for the projector 1 to perform a process of drawing an image with the control section 10, and projecting the image with the projection section 20 in accordance with the trajectory of the operation position of the first pointing member 6 or the second pointing member 7. Here, the drawing process performed by the control section in accordance with the operation position of the first pointing member 6 corresponds to a first process, and the drawing process performed by the control section in accordance with the operation position of the second pointing member 7 corresponds to a second process. Specifically, when the operation data representing that the operation position of the first pointing member 6 is P1 is generated in the step S17, then the position detection is not terminated (NO in the step S22), and then the operation data representing that the position P2 different from P1 is the operation position of the first pointing member 6 is generated by the position detection section 13 in the step S17, it is possible to perform a process of drawing a line connecting P1 and P2 with the control section 10, and then projecting the line with the projection section 20. It is also possible to draw a line in accordance with the operation positions of the second pointing member 7, and then project the line with the projection section 20 in substantially the same flow. In this case, by the user operating the first pointing member 6 and the second pointing member 7, it is possible for the projector 1 to draw an image or a figure in accordance with the operation. It is possible for the position detection section 13 to detect the operation position of the first pointing member 6 and the operation position of the second pointing member 7 from the imaging data D obtained by the imaging section 30 in a single imaging operation so as to be distinguished from each other. Therefore, it is possible to perform the process of drawing an image in accordance with the operation of the first pointing member 6 and the process of drawing an image in accordance with the operation of the second pointing member 7. For example, it is possible to perform a process of drawing another image based on the operation of the first pointing member 6 and the operation of the second pointing member 7. Further, it is also possible for the projector 1 to output the operation data generated by the position detection section 13 to an external device through a communication device or a communication interface not shown.

As described hereinabove, the projector 1 according to the present embodiment is provided with the imaging section 30. The imaging section 30 generates the imaging data D obtained by taking the image of the first light L1 emitted by the first pointing member 6, the second light L2 emitted by the second pointing member 7, and the target range DA. The projector 1 is provided with the position detection section 13 for detecting the first position of the first pointing member 6 with respect to the target range DA and the second position of the second pointing member 7 with respect to the target range DA based on the imaging data D so as to be distinguished from each other. The imaging section 30 is provided with the image sensor 32 for outputting the detection values of first colored light, second colored light, and third colored light. The projector 1 detects the first infrared light IR1 and the first visible light VL1 included in the first light L1 and the second infrared light IR2 and the second visible light VL2 included in the second light L2 with the image sensor 32. The first visible light VL1 is the light with the first wavelength, and the second visible light VL2 is the light with the second wavelength different from the first wavelength.

According to the position detection device related to the present disclosure, and the projector 1 which is related to the present disclosure and to which the position detection method related to the present disclosure is applied, it is possible to detect the operation position of the first pointing member 6 and the operation position of the second pointing member 7 from the imaging data D so as to be distinguished from each other. Since the imaging data D includes the detection values obtained by detecting the first light L1 and the second light L2 with the image sensor 32, the operation positions of the first pointing member 6 and the second pointing member 7 can be detected so as to be distinguished from each other using the imaging data D obtained by the imaging section 30 in a single imaging operation. The first visible light VL1 included in the first light L1 and the second visible light VL2 included in the second light L2 are different in wavelength from each other. Therefore, it is possible for the position detection section 13 to detect the operation position of the first pointing member 6 and the operation position of the second pointing member 7 so as to be distinguished from each other based on the colors of the images detected in the imaging data D. Therefore, the projector 1 which detects the operation positions of the plurality of pointing members each emitting light so as to be distinguished from each other can be realized with a simple configuration. Further, the first light L1 and the second light L2 include the first infrared light IR1 and the second infrared light IR2 in the infrared region, respectively. Therefore, it is possible for the position detection section 13 to reliably detect the operation positions of the first pointing member 6 and the second pointing member 7 even when an image in the visible region is formed in the imaging data D by outside light, environmental light, or light from a light source other than the first pointing member 6 and the second pointing member 7.

Here, the target range DA is a range to be a target of the detection of the positions of the first pointing member 6 and the second pointing member 7, and can also be reworded as a detection range.

In the projector 1, the image sensor 32 is provided with the plurality of light receiving elements 33 as the detection pixels. The imaging section 30 outputs the imaging data D including the detection values of the first colored light, the second colored light, and the third colored light corresponding to each of the light receiving elements 33. The first colored light, the second colored light, and the third colored light are, for example, the red light, the blue light, and the green light. The position detection section 13 detects the operation position of the first pointing member 6 and the operation position of the second pointing member 7 from the single piece of imaging data D including the single detection value corresponding to each of the detection pixels. Therefore, it is possible for the position detection section 13 to detect each of the image of the first light L1 emitted by the first pointing member 6 and the image of the second light L2 emitted by the second pointing member 7 so as to be distinguished from each other based on the detection values of the first colored light, the second colored light, and the third colored light from the imaging data D. Therefore, it is possible to promptly detect the detection positions of the two pointing members, namely the first pointing member 6 and the second pointing member 7, using the single piece of imaging data D.

The image sensor 32 has the sensitivity characteristic in which the relative sensitivity of the first colored light, the second colored light, and the third colored light in any of the wavelength bands B1, B2, and B3 does not coincide with the relative sensitivity of the first colored light, the second colored light, and the third colored light in other wavelength bands. Therefore, in the imaging data D, it is possible to distinguish the image of the first light L1 emitted by the first pointing member 6 and the image of the second light L2 emitted by the second pointing member 7 from each other as the images different in the components of the first colored light, the second colored light, and the third colored light from each other. Therefore, the detection positions of the two pointing members, namely the first pointing member 6 and the second pointing member 7, can easily be distinguished from each other in the imaging data D, and thus can promptly be detected.

Further, in the embodiment described above, the first wavelength is longer than the second wavelength. When the first wavelength is included in the wavelength band B3, the second wavelength is included in the wavelength band B1 or the wavelength band B2. When the first wavelength is included in the wavelength band B2, the second wavelength is included in the wavelength band B1. The imaging section 30 is provided with the optical filter 36 for cutting the light in at least a part of the wavelength band between the wavelength of the first infrared light IR1 and the first wavelength. The image sensor 32 detects the light having been transmitted through the optical filter 36. Therefore, it is possible to reduce the influence of the light belonging to the wavelength band between the first visible light VL1 and the first infrared light IR1 to promptly detect the image of the first light L1 and the image of the second light L2 from the imaging data D.

With respect to the sensitivity characteristic of the image sensor 32, the following conditions are satisfied. That is, at the wavelength of the first infrared light IR1, the relative sensitivity of the first colored light is higher than both of the relative sensitivity of the second colored light and the relative sensitivity of the third colored light. At the same time, at the wavelength cut by the optical filter 36, the relative sensitivity of the first colored light is higher than both of the relative sensitivity of the second colored light and the relative sensitivity of the third colored light. For example, in FIG. 6, the relative sensitivity (1) of the red color is higher than the relative sensitivity (2) of the green color and the relative sensitivity (3) of the blue color in the wavelength band B4 in which the first infrared light IR1 is included. Further, in the wavelength band BA2 cut by the optical filter 36, the relative sensitivity (1) of the red color is higher than the relative sensitivity (2) of the green color and the relative sensitivity (3) of the blue color. Since the image sensor 32 has such a sensitivity characteristic, the first light L1 including the first infrared light IR1 and the second light L2 show as the images of different colors from the light in the visible region in the imaging data D. Therefore, it is difficult to be affected by outside light, environmental light, or light from a light source other than the first pointing member 6 and the second pointing member 7, and it is possible to reliably detect the operation positions of the first pointing member 6 and the second pointing member 7.

The optical filter 36 cuts the light longer in wavelength than the first infrared light IR1. Therefore, it is possible to more promptly detect the images of the first light L1 and the second light L2 from the imaging data D while eliminating the influence of other infrared light than the first infrared light IR1 and the second infrared light IR2.

Since the optical filter 36 cuts the light with the wavelength in the ultraviolet region, it is possible to eliminate the influence of the incident light OL in the ultraviolet region to more promptly detect the images of the first light L1 and the second light L2 from the imaging data D.

Further, since the first infrared light IR1 and the second infrared light IR2 include the light with the same wavelength, it is possible to simplify the configuration of the first pointing member 6 and the second pointing member 7 while ensuring a high detection accuracy with the position detection section 13.

The first visible light VL1 included in the first light L1 and the second visible light VL2 included in the second light L2 are the light in the visible region. Therefore, it is possible for the first pointing member 6 to emit light in accordance with the operation of the user to inform the user of the fact that the position detection is performed, and thus, it is possible to achieve an improvement in operability. The same applies to the second pointing member 7.

The projector 1 as a display device is provided with the projection section 20 for displaying the image based on the image data on the display surface. The projector 1 is provided with the imaging section 30, the position detection section 13, and the control section 10 as a processing section for performing the first process corresponding to the first position and the second process corresponding to the second position. Therefore, it is possible to distinguish the first position and the second position from each other to promptly detect the first position and the second position, and it is possible to promptly perform the first process and the second process based on the positions thus detected.

The control section 10 as the processing section performs processes of performing drawings different from each other as the first process and the second process. Specifically, it is possible for the control section 10 to draw an image corresponding to the trajectory of the operation position of the first pointing member 6 as the first process, and draw an image corresponding to the trajectory of the operation position of the second pointing member 7 as the second process.

The projection system 100 functions as a display system having the projector 1 provided with the projection section 20 for displaying the image based on the image data on the display surface, and the first pointing member 6 and the second pointing member 7 used for the position pointing operation in the screen SC. The first pointing member 6 emits the first light L1, and the second pointing member 7 emits the second light L2. In the projection system 100, it is possible to perform the position pointing operation using each of the first pointing member 6 and the second pointing member 7. Further, it is possible for the projector 1 to distinguish the first position as the operation position of the first pointing member 6 and the second position as the operation position of the second pointing member 7 from each other to promptly detect the first position and the second position.

The first pointing member 6 is provided with the first switch 66 for detecting the operation, the first visible light source 63, the first infrared light source 64, and the first light emission control section 65 for making the first visible light source 63 and the first infrared light source 64 emit light when the first switch 66 has detected the operation. The second pointing member 7 is provided with the second switch 76 for detecting the operation, the second visible light source 73, the second infrared light source 74, and the second light emission control section 75 for making the second visible light source 73 and the second infrared light source 74 emit light when the second switch 76 has detected the operation. Therefore, the first pointing member 6 emits the first light L1 when the operation has been detected by the first switch 66, and the second pointing member 7 emits the second light L2 when the operation has been detected by the second switch 76. Therefore, it is possible for the projector 1 to detect the operation position when the operation of the first pointing member 6 has been performed, and the operation position when the operation of the second pointing member 7 has been performed so as to be distinguished from each other. Therefore, it is possible to promptly detect presence or absence of the operation of the first pointing member 6 and the second pointing member 7, and the operation positions.

The first visible light source 63 provided to the first pointing member 6 emits the first visible light VL1 in the visible region, and the second visible light source 73 provided to the second pointing member 7 emits the second visible light VL2 in the visible region. Therefore, since it is possible for the user to recognize the light emitted by the first pointing member 6 and the light emitted by the second pointing member 7 in accordance with the operation, it is possible to achieve an improvement in usability.

Other Embodiments

The embodiment described above shows a specific example to which the present disclosure is applied, and the present disclosure is not limited to the embodiment.

In the embodiment described above, there is illustrated the configuration in which the first pointing member 6 and the second pointing member 7 emit the light when the operations have been detected by the first switch 66 and the second switch 76, respectively. The present disclosure is not limited to this configuration, but it is also possible to adopt a configuration in which the first pointing member 6 emits the first light L1 in the state in which the first switch 66 has not been operated. Further, it is also possible for the first switch 66 to have a configuration in which infrared light beams with a plurality of wavelengths are switched to be emitted. For example, it is also possible to adopt a configuration in which the wavelength of the infrared light emitted from the first visible light source 63 and/or the first infrared light source 64 is switched between the state where the first switch 66 has not been operated, and the state where the first switch 66 has been operated. As described above, the imaging section 30 is provided with the image sensor 32 for detecting the plurality of infrared light beams different in wavelength from each other with the different relative sensitivity. Therefore, it is possible for the position detection section 13 to detect the operation position of the first pointing member 6 and presence or absence of the operation of the first switch 66 based on the imaging data D. The same applies to the second pointing member 7.

Further, in the embodiment described above, the values illustrated as the wavelengths of the first visible light VL1, the second visible light VL2, the first infrared light IR1, and the second infrared light IR2 are illustrative only. It is possible to adopt different wavelengths from those in the example described above. Further, it is also possible to adopt a configuration of using three or more pointing members in the projection system 100, and in this case, it is sufficient to adopt a configuration in which the pointing members emit light beams in the respective wavelength bands different from each other selected from the wavelength bands B1, B2, and B3.

Further, the configuration of each of the first pointing member 6 and the second pointing member 7 is arbitrary, and for example, it is also possible to adopt a configuration provided with a plurality of light sources, or a configuration provided with a plurality of first switches 66 or a plurality of second switches 76. Further, the shape of each of the first pointing member 6 and the second pointing member 7 is not limited to the pen type, but it is also possible to adopt, for example, a shape to be mounted on a finger or a hand of the user.

Further, although in the embodiment described above, there is illustrated the configuration in which the target range DA coincides with the projection image PS, the present disclosure is not limited to this configuration. The target range DA preferably includes a part of the projection image PS, but is not required to coincide with the projection image PS, and can also include the projection image PS and the periphery of the projection image PS, or it is also possible to adopt a configuration in which a part of the projection image PS forms the target range DA.

Further, the display device according to the present disclosure is not limited to the projector 1, but a liquid crystal monitor or a liquid crystal television set for displaying an image on a liquid crystal panel can also be used as the display device, or it is also possible to use devices adopting other display types.

Figure 8:
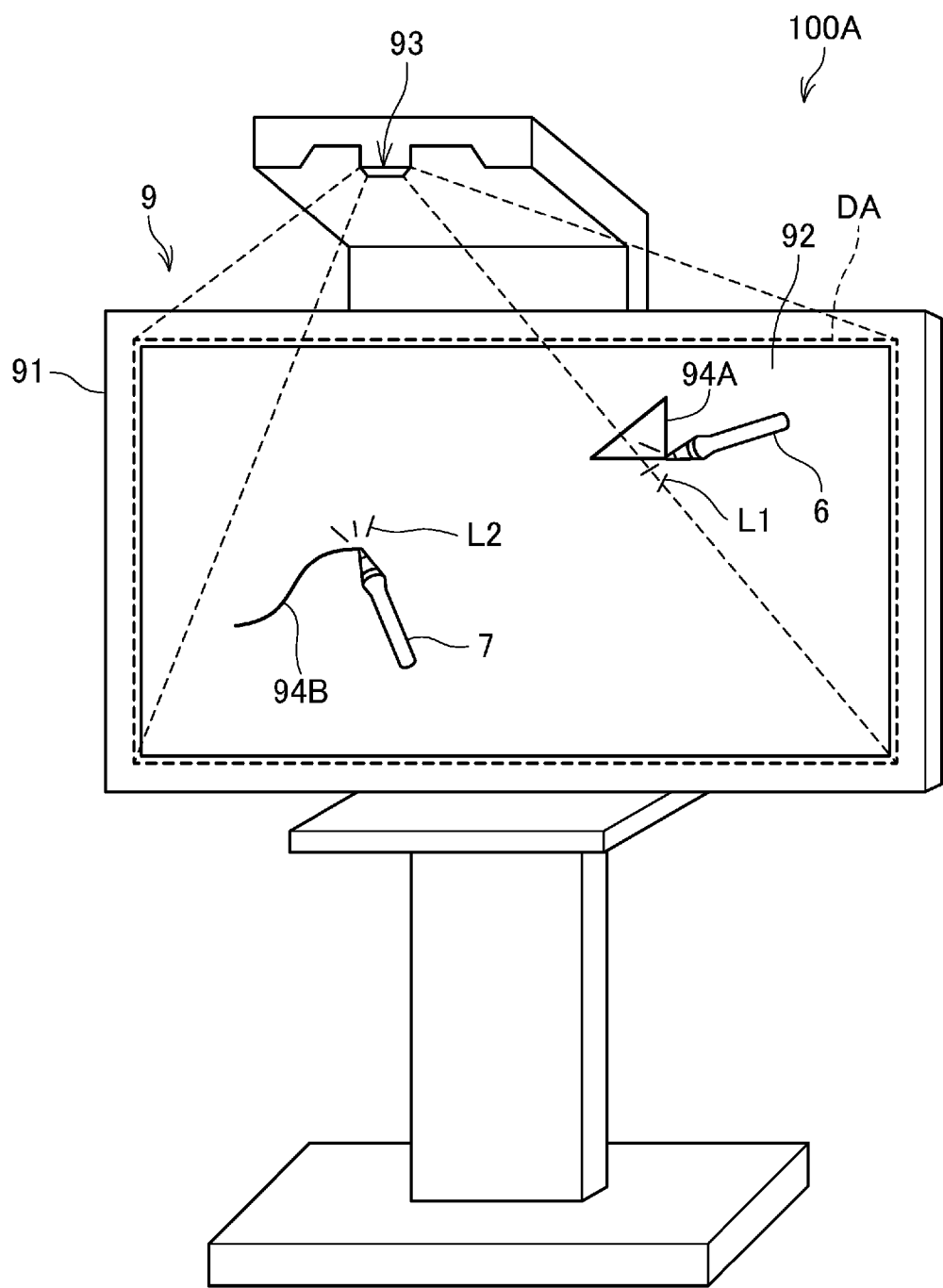
FIG. 8 is a diagram showing a configuration of a projection system as a modified example.

FIG. 8 is a diagram showing a configuration of a projection system 100A as a modified example to which the present disclosure is applied.

The projection system 100A shown in FIG. 8 is a system having a display 9, the first pointing member 6, and the second pointing member 7 combined with each other. In the display 9, a main body 91 is provided with a display surface 92. The display surface 92 is formed of a liquid crystal display panel, a plasma display panel, an OLED (organic light-emitting diode), an OEL (organic electro-luminescence) display, or the like. The display 9 is a display device for displaying an image on the display surface 92 similarly to the projector 1.

Above the main body 91 of the display 9, there is disposed an imaging section 93. The imaging section 93 is a digital camera similarly to the imaging section 30.

On the display surface 92, there is set the target range DA. The target range DA is a target area where operations of the first pointing member 6 and the second pointing member 7 are detected. The imaging section 93 is disposed so as to take an image of the target range DA, and it is preferable for the imaging section 93 to take an image of the whole of the target range DA.

Similarly to the embodiment described above, the first pointing member 6 emits the first light L1, and the second pointing member 7 emits the second light L2. The display 9 detects the pointing position of the first pointing member 6 and the pointing position of the second pointing member 7 based on the taken image obtained by taking the image of the target range DA with the imaging section 93, and then performs the process based on the positions thus detected. For example, the display 9 draws an image 94A along the trajectory of the pointing position of the first pointing member 6, draws an image 94B along the trajectory of the pointing position of the second pointing member 7, and then display the images on the display surface 92.

As described above, the specific aspect of the display device according to the present disclosure can arbitrarily be modified, and it is possible to obtain substantially the same advantages as those of the configuration described in the above embodiment in a variety of aspects.

Further, each of the functional sections shown in FIG. 2 and FIG. 3 is for showing the functional configuration, and the specific implementation configuration is not particularly limited. In other words, it is not necessarily required to install the hardware corresponding individually to each of the functional sections, but it is obviously possible to adopt a configuration of realizing the functions of the plurality of functional sections by a single processor executing a program. Further, it is also possible to adopt a configuration in which a plurality of processors cooperates with each other to realize the function of one of the functional sections or the functions of two or more of the functional sections. Further, apart of the function realized by software in the embodiment described above can also be realized by hardware, or a part of the function realized by hardware can also be realized by software. Besides the above, the specific detailed configuration of each of the sections constituting the projection system 100 can arbitrarily be modified within the scope or the spirit of the present disclosure.

What is claimed is:

1. A position detection device comprising:
a camera configured to generate imaging data obtained by taking an image of first light emitted by a first pointing member, second light emitted by a second pointing member, and a target range; and
one or more processors configured to detect a first position of the first pointing member with respect to the target range and a second position of the second pointing member with respect to the target range based on the imaging data so as to be distinguished from each other, wherein the camera includes a sensor configured to output detection values of first colored light, second colored light, and third colored light to detect first infrared light and light with a first wavelength included in the first light and second infrared light and light with a second wavelength different from the first wavelength included in the second light with the sensor, the sensor is formed of an image sensor including a plurality of detection pixels, the camera outputs the imaging data including the detection values of the first colored light the second colored light, and the third colored light corresponding to each of the detection pixels, and the one or more processors detects the first position and the second position from one piece of the imaging data including the one detection value corresponding to each of the detection pixels.

2. The position detection device according to claim 1, wherein the first wavelength is longer than the second wavelength, and the camera includes an optical filter configured to cut light in at least a part of a wavelength band between a wavelength of the first infrared light and the first wavelength, and the sensor detects light transmitted through the optical filter.

3. The position detection device according to claim 2, wherein the sensor has a sensitivity characteristic in which
the relative sensitivity of the first colored light is higher than both of the relative sensitivity of the second colored light and the relative sensitivity of the third colored light at the wavelength of the first infrared light, and
the relative sensitivity of the first colored light is higher than both of the relative sensitivity of the second colored light and the relative sensitivity of the third colored light at the wavelength cut by the optical filter.

4. The position detection device according to claim 2, wherein the optical filter cuts light longer in wavelength than the first infrared light.

5. The position detection device according to claim 2, wherein the optical filter cuts light in an ultraviolet region t.

6. The position detection device according to claim 1, wherein the light with the first wavelength included in the first light and the light with the second wavelength included in the second light are each light in a visible region.

7. A position detection device comprising:

a camera configured to generate imaging data obtained by taking an image of first light emitted by a first pointing member, second light emitted by a second pointing member, and a target range; and one or more processors configured to detect a first position of the first pointing member with respect to the target range and a second position of the second pointing member with respect to the target range based on the imaging data so as to be distinguished from each other, wherein the camera includes a sensor configured to output detection values of first colored light, second colored light and third colored light to detect first infrared light and light with a first wavelength included in the first light and second infrared light and light with a second wavelength different from the first wavelength included in the second light with the sensor, and the sensor has a sensitivity characteristic in which relative sensitivity of the first colored light, the second colored light, and the third colored light at the first wavelength fails to coincide with relative sensitivity of the first colored light, the second colored light, and the third colored light at the second wavelength.

8. The position detection device according to claim 7, wherein the sensor is formed of an image sensor including a plurality of detection pixels; the camera outputs the imaging data including the detection values of the first colored light, the second colored light, and the third colored light corresponding to each of the detection pixels, and the one or more processors detects the first position and the second position from one piece of the imaging data including the one detection value corresponding to each of the detection pixels.

9. A position detection device comprising:

a camera configured to generate imaging data obtained by taking an image of first light emitted by a first pointing member, second light emitted by a second pointing member, and a target range; and one or more processors configured to detect a first position of the first pointing member with respect to the target range and a second position of the second pointing member with respect to the target range based on the imaging data so as to be distinguished from each other, wherein the camera includes a sensor configured to output detection values of first colored light, second colored light, and third colored light to detect first infrared light and light with a first wavelength included in the first light and second infrared light and light with a second wavelength different from the first wavelength included in the second light with the sensor, and a wavelength band of the first infrared light and a wavelength band of the second infrared light include a same wavelength.

10. A display system comprising:

a display device including an image display or a lens configured to display an image based on image data on a display surface; and a first pointing member and a second pointing member used for a position pointing operation on the display surface, wherein the first pointing member emits first light, the second pointing member emits second light, the display device includes
a camera configured to generate imaging data obtained by taking an image of the first light emitted by the first pointing member, the second light emitted by the second pointing member, and at least a part of the display surface, and
one or more processors configured to detect a first position of the first pointing member with respect to the display surface and a second position of the second pointing member with respect to the display surface based on the imaging data so as to be distinguished from each other, and the one or more processors is configured to perform a first process corresponding to the first position and a second process corresponding to the second position, and the camera includes an optical sensor configured to output detection values of first colored light, second colored light, and third colored light to detect first infrared light and light with a first wavelength included in the first light and second infrared light and light with a second wavelength different from the first wavelength included in the second light with the optical sensor.

11. The display system according to claim 10, wherein the first pointing member and the second pointing member each include an operation sensor configured to detect an operation, a light source, and a light emission controller sect en configured to make the light source emit light when the operation sensor detected the operation.

12. The display system according to claim 10, wherein the light source provided to the first pointing member emits the light with the first wavelength in a visible region, and the light source provided to the second pointing member emits the light with the second wavelength in the visible region.

* * * * *